United States Patent [19]

Copeland

[11] 4,315,286

[45] Feb. 9, 1982

[54] RECORDERS

[76] Inventor: Peter Copeland, 11, June Close, Pagham, Bognor Regis, Sussex PO21 4UH, England

[21] Appl. No.: 72,904

[22] Filed: Sep. 6, 1979

[51] Int. Cl.³ .................. G11B 15/18; G11B 27/24
[52] U.S. Cl. .................. 360/72.2; 360/72.1; 360/49
[58] Field of Search .............. 360/72.2, 72.1, 74.4, 360/27, 49

[56] References Cited

U.S. PATENT DOCUMENTS

| | | | |
|---|---|---|---|
| 3,681,523 | 8/1972 | Sidline | 360/72.2 |
| 4,014,039 | 3/1977 | Yasunaga | 360/72.1 |
| 4,066,349 | 1/1978 | Flint | 360/72.1 X |
| 4,066,872 | 1/1978 | Karp et al. | 360/72.1 X |

Primary Examiner—John H. Wolff
Attorney, Agent, or Firm—Morgan, Finnegan, Pine, Foley & Lee

[57] ABSTRACT

An attachment for a data recording machine having a movable recording medium which comprises, circuitry for receiving and storing a first signal indicative of a rest position of the data recording medium and circuitry for entering a second signal indicative of a required position of the data recording medium. Further circuitry is provided arranged to compare said first and second signals to predict any required operation of fast-rewind or fast-forward controls and to cause any such actuation of said controls, in use.

5 Claims, 4 Drawing Figures

RECORDERS

The invention relates to data recording machines and particularly, although not exclusively, provides an apparatus for use with, but without modification to, video audio, and other data recording machines which employ soleroid operated mechanisms for the control of play, fast-forward, fast-rewind and stop functions.

Most such machines have a mechanical arrangement referred to as a revolutions counter which serves to give an approximate indication of the number of revolutions the tape-feed or take-up spool makes as the tape is transported through the machine. Locating a particular item requires the operator to note the particular rev. number and manually operate the fast-forward play and fast-rewind controls until the programme number is located. This technique is only an approximate method of programme location due to the errors caused by tape stretch and mechanical slippage.

Alternative systems of programme location (described in my copending United Kingdom patent applications Nos. 37844/77 and 2172/78) rely on a sensing head in contact with the tape during fast functions, which can detect the address code of a programme in this condition or alternatively can count the gaps (absence of signal) or a defined signal between programmes and compare this with an address entered via a keypad.

In contrast it is an object of the present invention to provide an apparatus which does not depend on any sensing of signal during fast-forward and fast-rewind and can thus be employed with machines which do not maintain head to tape contact during fast-function operation.

According to one aspect of the invention there is provided an attachment for a data recording machine which comprises, means for receiving and storing a first signal indicative of a rest position of the data recording medium, means for entering a second signal indicative of a required position of the data recording medium, means arranged to compare said first and second signals to predict any required operation of fast-rewind or fast-forward cntrols and to cause any such actuation of said controls, in use.

Said comparison and actuation means may be arranged to perform such functions a plurality of times to move the data recording medium to its required position according to the accuracy of said first signal.

Said means for entering said second signal may comprise a keyboard.

Said comparison and actuation means may be arranged such that when the comparison requires the data recording medium to be moved in a forward direction to reach the required position the fast-forward control is arranged to be operated for a time in accordance with the following:

$$T_f = \sqrt{\frac{\left[U_4^2 + 2a_s\left(L - \frac{U_4 t_i}{2}\right)\right] - U_4}{a_s}} + t_i \text{ secs.}$$

where
- $T_f$ = total time for which fast-forward is operated in order to reach a selected medium location.
- $U_4$ = fast-forward velocity reached $t_i$ secs. after starting from rest.
- $a_s$ = secondary acceleration in fast-forward.
- $L$ = distance between the location at which the medium is at rest and the location required.
- $t_i$ = time for the medium to travel initial distance during the period of initial acceleration.

Said comparison and actuation means may be arranged such that when the comparison requires the data recording medium to be moved in a reverse or rewind direction to reach the required position the fast-rewind control is arranged to be operated for a time in accordance with the following:

$$T_R = \sqrt{\frac{\left[R_4^2 + 2f_s\left(L - \frac{R_4 t_i}{2}\right)\right] - R_4}{f_s}} + t_i \text{ secs}$$

where
- $T_R$ = total time for which fast-rewind is operated in order to reach a selected tape location.
- $R_4$ = fast-rewind velocity reached $t_i$ secs. after starting from rest.
- $f_s$ = secondary acceleration in fast-rewind.
- $L$ = distance between the location at which the tape is at rest and the location required.
- $t_i$ = time for the medium to travel initial distance during the period of initial acceleration.

According to a further aspect of the invention there is provided a method of operating a data recording machine in combination with an attachment apparatus as defined in the next preceding six paragraphs which comprises locating a calibration data medium into the recording machine and operating the machine such as to enable the attachment apparatus to derive and store required parameters for the recording machine.

The foregoing and further features of the invention may be more readily understood from the following description of a referred embodiment thereof, by way of example with reference to the accompanying drawings in which.

Figure 1:
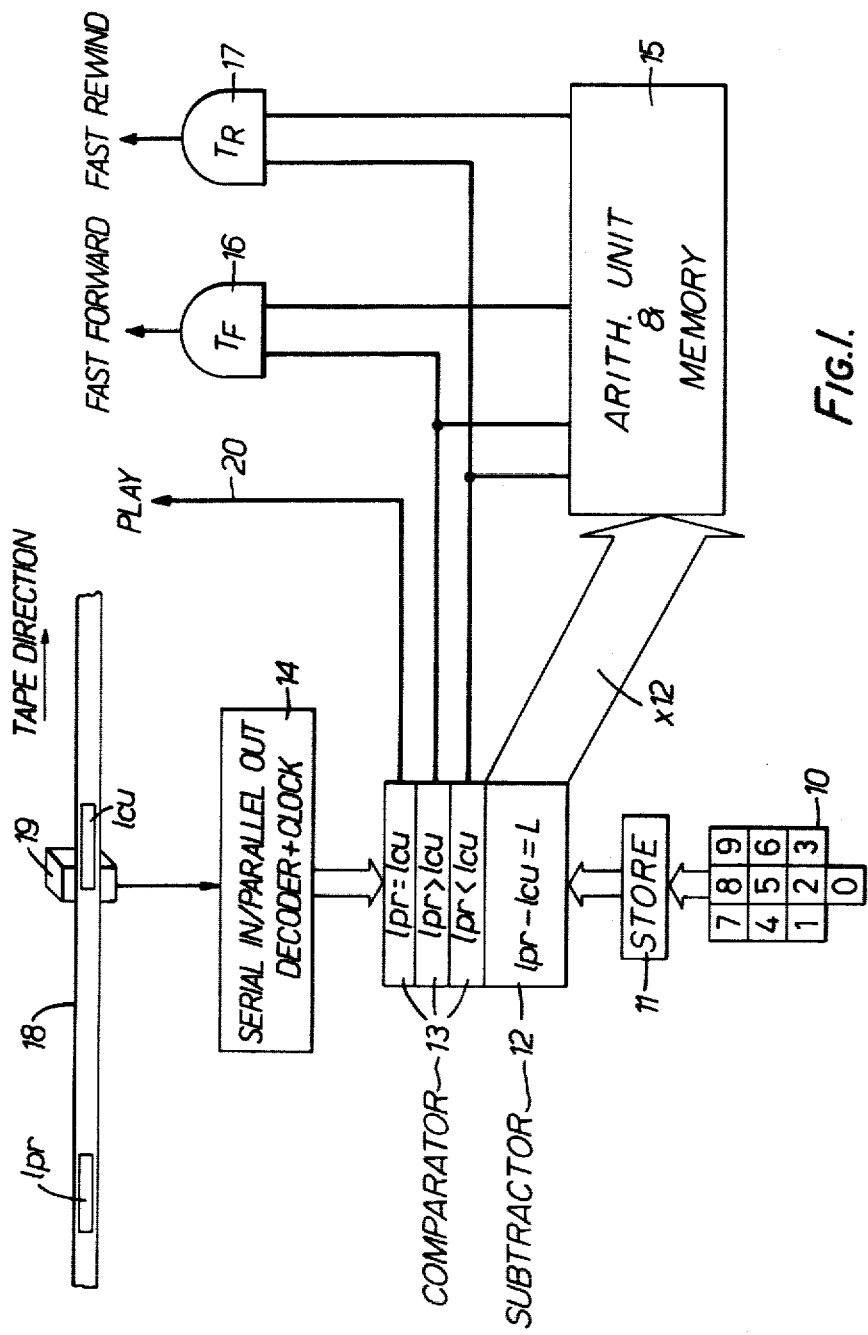
FIG. 1 is a block schematic representation of an attachment apparatus for use with a data recording machine.

Referring firstly to FIG. 1 there is shown a block schematic representation of an attachment apparatus for use with a data recording machine e.g. a tape recorder/player. The attachment apparatus comprises a keyboard 10, a store 11, a subtractor 12, a magnitude comparator 13, a decoder and clock 14, an arithmetic unit and read only memory 15 and two AND gates 16 and 17.

In use a tape 18 in a tape recorder has information relating to the addresses of programmes recorded thereon. When it is required to move the tape to a selected address lpr, such address is entered into keyboard 10 and transferred to store 11. The current address lcu at which the tape is situated is transferred from read head 19 via decoder 14 to comparator 13. The addresses lpr and lcu are compared and if the same a signal to the recorder to play is sent to the recorder via a lead 20. When address lpr is greater than lcu a signal from comparator 13 is passed to AND gate 16 and when address lpr is smaller than lcu a signal from comparator 13 is passed to AND gate 17. The difference between addresses lpr and lcu is determined by subtractor 12 and the value of such difference passed as a signal to arithmetic unit 15. The memory in unit 15 has stored in it parameters for the recorder being controlled, as will hereinafter be described, and from the signal passed from subtractor 12 predicts the tape movement required to reach address lpr. Signals are sent to either gate 16 to produce a fast forward control signal or to gate 17 to produce a fast-rewind control signal to the tape recorder. When the predicted time has elapsed the signal is removed to provide a stop signal by absence of the control signal. The comparison/subtraction procedure may then be repeated if the required address has not been reached or overrun. The accuracy of prediction depends on the number of recorded programme addresses on the tape and on other parameters as will hereinafter be more fully discussed.

The units 11, 12, 13 and 15 may be provided in the form of a micro processor and detailed description of of how the prediction process is performed is given below. Information relating to the addresses of programmes is obtained from the tape only during the 'play' condition and is in the form of a time code previously recorded on the tape.

By entering on a keyboard 10 the address of the programme required, the microprocessor calculates an estimated period for which the tape must run in the fast-rewind and fast-forward condition in order to reach the required programme.

The particular advantages of this technique are:
(a) No internal modification is necessary to the machine being used.
(b) Machines with different tape transport characteristics can be employed.
(c) The accuracy of location can be programmed.
(d) The technique can be applied to video, audio, data, film or other serialized forms of information storage.

The system employs a microprocessor which receives data from the tape 18, in the form of a time code encoded with the normal video, audio or data dignals, and from a keyboard 10 by which the user selects the programme required.

The microprocessor is programmed initially to perform a calibration procedure using a test tape. During this calibration various velocity parameters are established and stored in memory. After calibration and given the address of a recorded programme the microprocessors controls the functioning of the machine until the programme is located.

The system can be referred to as the predicted location and retrievel of programmes or sequences within the programmes (audio, video, data, film) by the calibration of velocity and acceleration parameters and the electronic calculation of distance give the initial and final locations.

The concept described thus uses the technique of being able to define to a reasonable accuracy the time taken for tape to travel in a fast function mode from point A to point B.

Because this time will vary according to the given location of the tape and the distance from the start location (lcu) to the location selected, (lpr) then an equation which can take into account the variables associated with the procedure must first be solved by using a test tape to calibrate the particular machine being used. This calibration would take place when first connecting the machine to the microprocessor control unit.

Experiments have shown that the usual velocity/time characteristics for magnetic tape transport systems can be approximated to two straight line graphs for the operation of both fast-forward and fast-rewind conditions at various starting locations.

Figure 3:
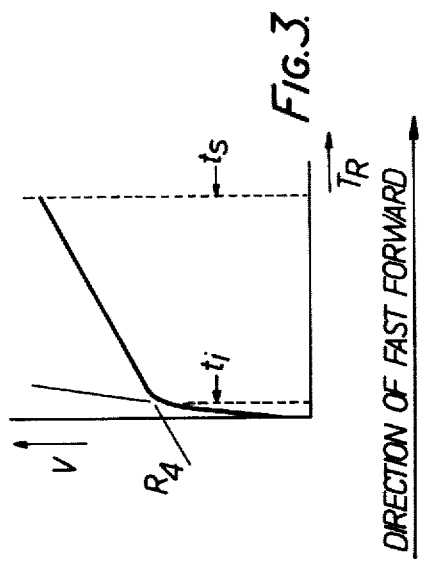
FIGS. 2 and 3 are graphs representing mathematical models for approximating calculations to be performed by the apparatus of FIG. 1.
Figure 2:
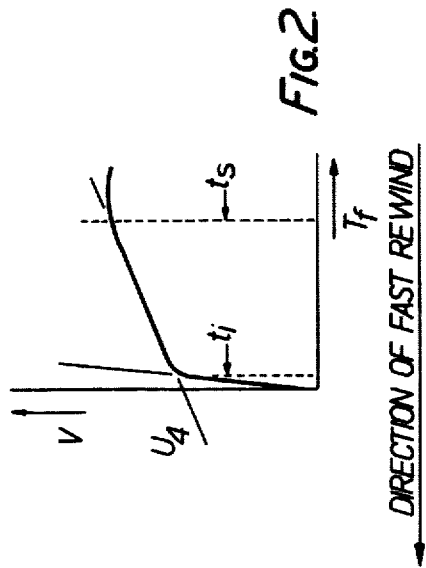

Mathematical models which represent these approximations FIGS. 2 and 3 have been devised using the constant acceleration formulae:

$$S = \frac{U + V}{2} \cdot t \text{ and } S = Ut + \tfrac{1}{2}ft^2$$

and arranging to solve for 't' using the general formula for the solution of a quadratic equation and taking the positive alternative.

The total time for which the tape is required to run in the fast-forward condition is thus given by the equation:

$$T_f = \sqrt{\frac{\left[U_4^2 + 2a_s\left(L - \frac{U_4 t_i}{2}\right)\right] - U_4}{a_s}} + t_i \text{ secs.}$$

where:
$T_f$ = total time for which fast-forward is operated in order to reach a selected tape location.
$U_4$ = fast-forward velocity reached $t_i$ secs. after starting from rest.
$a_s$ = secondary acceleration in fast-forward.
$L$ = distance between the location at which the tape is at rest and the location required.
$t_i$ = time for the tape to travel initial distance $S_i$ over the period of initial acceleration $a_i$.

The total time for which the tape is required to run in the fast-forward condition is given by the equation:

$$T_R = \sqrt{\frac{\left[R_4^2 + 2f_s\left(L - \frac{R_4 t_i}{2}\right)\right] - R_4}{f_s}} + t_1 \text{ secs.}$$

where:
$T_R$ = total time for which fast-rewind is operated in order to reach a selected tape location.
$R_4$ = fast-rewind velocity reached $t_i$ secs. after starting from rest.
$f_s$ = secondary acceleration in fast-rewind.
$L$ = distance between the location at which the tape is at rest and the location required.
$t_i$ = time for the tape to travel initial distance $S_i$ over the period of initial acceleration $f_i$.

The calibration procedure thus has to arrive at values for $U_4$, $R_4$, $a_s$ and $f_s$. These values are then stored in the microprocessor memory.

The microprocessor is arranged to receive an input via a 10 digit keyboard 10. The input represents the location address (lpr) of the selected programme and this for example could be in the form of a number corresponding to the playing time in seconds.

The microprocessor is also arranged to receive an input from the tape during play which corresponds to a current location address (lcu).

This input can be encoded along with the video, audio or data signals being replayed and can be recorded at various frequencies e.g. every tenth of a second or every second or every minute etc.

To limit the frequency of occurrence and improve error rejection use can be made of the address signal (lcu) to up-date a clock from which the input to the microprocessor can be derived.

Given the location address of the required programme the microprocessor compares this with the current location address and calculates the distance between the two together with the direction of tape movement (e.g. L for $T_f$ of $T_R$).

The location address input also enables the microprocessor to call from memory a calibrated value appropriate for $U_4$ to $R_4$ and a calibrated value for $a_s$ or $f_s$.

When the microprocessor is programmed to retrieve the selected programme (e.g. by the pressing of a 'search' or 'retrieve' button) it performs the calculation and solves for either $T_R$ or $T_f$ of the Time in fast-function equation.

The microprocessor via an interface unit then causes the tape to run in either fast-forward or fast-rewind for the time given.

On reaching the predicted location the retrieve sequence is again performed by the microprocessor with the revised current address being used. A decision by the microprocessor of whether to play the programme or fast-forward or fast-rewind is made according to the value of L calculated.

By adjusting the programmed value of L needed to achieve the condition PLAY the retrieval accuracy is similarly altered.

Calibration technique

A tape with the calibration programme and timecode is loaded into the replay machine.

The tape is played until the software routine is loaded into the memory of the microprocessor unit. The microprocessor can now control the functioning of the machine for play, fast-forward, fast-rewind and stop conditions.

The tape is manually rewound to the start position and the microprocessor set to perform the calibration.

Figure 4:
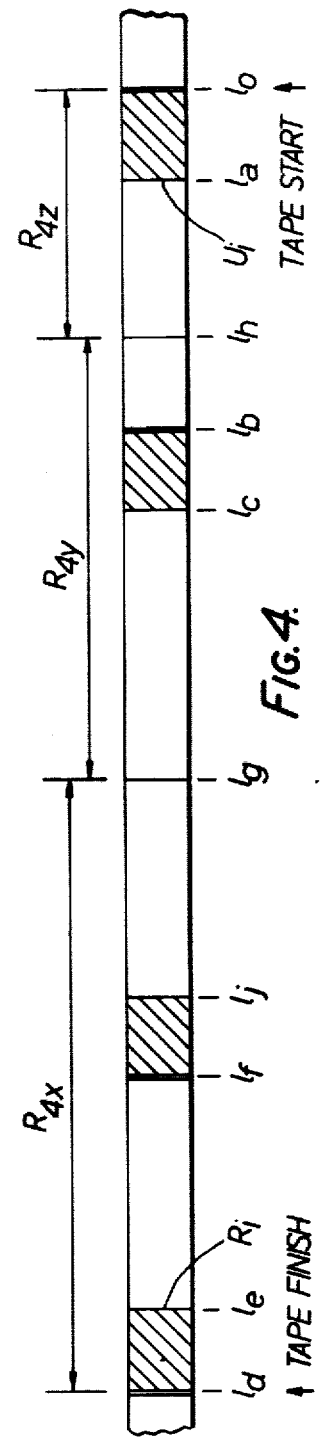
FIG. 4 is a representation of distribution of locations for use in a calibration procedure of a data recording machine with which the apparatus of FIG. 1 is to be used.

$T_f$ parameters $U_4$ and $a_s$ (see FIG. 4)

The fast-forward mode is operated for a period corresponding to $t_i$ and defined by the calibration programme (usually 4 secs).

The location address at the end of this time is sampled and a value for $S_i$ is obtained and stored (in this instance $S_i = l_a - l_o$, thus $S_i = l_a$.

From the constant acceleration formula $S = (V+U)/2 \times t$ the formula $S_i = (U_i + U) \times t_i$ is obtained.

V in this case corresponds to the velocity after time $t_i = U_i$ for $l_c = l_o$. U is the initial velocity which in this case $= 0$. This formula is rearranged and written in the software routine as:

$$U_i = 2S_i/t_i \tag{1C}$$

The values of $S_i$ and $t_i$ (i.e. 4 secs) are now entered and the formula 1C solved for $U_i$. The value for $U_i$ is stored.

The tape is fast-rewound to the start position.

Calibrating $a_s$

The tape is now caused to operate in the fast-forward mode for a software defined period corresponding to $T_f$ (total fast-forward time to reach required location lpr: e.g. let $T_f = 100$ secs.

The location address ($l_b$) at the end of this time is sampled and a value for $S_s = L - S_i$ is obtained using the value for $S_i$ which was obtained and stored previously. ($L = l_b - l_a$ but in this case the start location $l_c$ is zero thus $L = l_b$).

From the constant acceleration formula $S = Ut + \frac{1}{2}at^2$ the formula $S_s = U_4 t_s + \frac{1}{2} a_s t_s^2$ is obtained. This formula is rearranged and written in the software routine to be solved for $a_s$: viz $$a_s = \frac{2(S_s - U_4 t_s)}{t_s^2} \tag{2C}$$

Since $T_f = t_i + t_s$ (as defined by experimental procedure)

$$t_s = T_f - t_i$$

The value of $t_s$ is entered in the software routine since both $T_f$ and $t_i$ are also software defined values. Substituting the values given as examples:

$$t_s = 100 - 4 = 96 \text{ secs.}$$

Using the value for $U_i$ the value for $S_s$ and the value for $t_s$ the equation given in (2C) is solved for $a_s$ and the value stored.

Calibrating $U_4$ for values of lcu

By experiment it has been found that the value for $U_4$ increases with increase of start location (lcu). In the case of fast-forward this increase is approximately linear and can thus be represented by the formula:

$$U_4 = U_i + K\text{lcu} \tag{3C}$$

where K is the constant of initial velocity increase.

Given that $U_i$ has been calibrated and lcu can be found by sampling the tape location, then if K can be calibrated, this formula can be solved for $U_4$ at each retrieval procedure.

The formula is rearranged to be solved for K, viz:

$$K = (U_4 - U_i)/\text{lcu} \tag{4C}$$

The tape is still at a location (lcu = $l_b$) into the tape and from this location it is caused to operate in the fast forward mode for software defined period ($t_i$) e.g. 4 secs. The location (lcu = $l_c$) is now sampled.

The microprocessor solves $S_i = l_c - l_b$ i.e. the initial distance travelled in the period $t_i$ (4 secs) for the location lcu = $l_b$ into the tape.

Using the formula (1C) the velocity reached after time $t_i$ (4 secs) for tape location $l_b$ is calculated, viz:

$$U_4 = 2(l_c - l_b) \tag{5C}$$

This value for $U_4$ is then substituted in equation 4C which is solved for K for the location $l_b$.

The parameters necessary for predicting $T_f$ have now been calibrated $T_R$ Parameters $f_s$ and $R_4$.

The tape is still at a position corresponding to lcu=$l_c$ in FIG. 3. It is now caused by Play until a position near the end of the tape is reached, i.e. lcu=$l_d$. On reaching this location the tape is caused to stop.

The tape is fast rewound for a software defined period $t_i$ (e.g. 4 secs).

The location address at the end of this time is now sampled ($l_e$) and a value for $S_i$ is obtained from $$S_i = l_d - l_e.$$

The formula 1C is applied to establish the fast rewind parameter $R_i$ viz:

$$R_i = (2S_i / t_i) \tag{6c}$$

Calibrating $f_s$

The tape is now played until the previous location $l_d$ is reached at which time it is stopped.

The tape is now caused to operate in the fast-rewind mode for a software defined period corresponding to $T_R$ (e.g. $T_R = 40$ secs).

The location address at the end of this time is sampled ($l_f$) and a value for $S_s$ is calculated from $S_s = l_e - l_f$.

The formula 2C is applied to establish the fast-rewind parameter $f_s$ viz:

$$f_s = 2(S_s - R_i t_s) \tag{7C}$$

Since $T_R = t_i + t_s$ then $t_s = T_R - t_i$. The value for $t_s$ is thus already entered in the software routine (in the example given $t_s = 40 - 4 = 36$ secs).

Using the value for $R_i$ already stored the equation is solved by the microprocessor for $f_s$.

Calibrating $R_4$ for values of lcu.

The value for $R_4$ increases with the decreasing values of start location. This increase is not linear for all values of lcu but can be approximated to say 3 linear functions representing the sections of tape from 35 to 20 mins, 20 to 10 mins, and 10 to 0 mins.

The following equations, from formula given in 3C, thus yield the approximate values for $R_4$ at various tape locations.

$$R_{4x} = R_i + K_x \text{lcu for lcu} = 35 \text{ to } 20 \tag{8C}$$

$$R_{4y} = R_y + K_y \text{lcu for lcu} = 20 \text{ to } 10 \tag{9C}$$

$$R_{4z} = R_z - K_z \text{lcu for lcu} = 10 \text{ to } 00 \tag{10C}$$

where $R_{4x}$, $R_{4y}$ and $R_{4z}$ represent the velocity 4 secs. from any given location in the tape sections $l_{35}$, $l_{20}$ and $l_{10}$.

where $R_i$, $R_y$ and $R_z$ represent the velocity 4 secs. from the locations $l_{35}$ ($l_d$) $l_{20}$ ($l_g$) $l_{10}$ ($l_h$) respectively.

Calibrating $K_x$

Rearranging 8C to solve for $K_x$:

$$K_x = (R_{4x} - R_i) \tag{11C}$$

Since $R_i = 2(l_d - l_e) t_i$ (see equation 6C)

$R_{4x}$ is the remaining unknown parameter.

The tape is still at location $l_f$ and from here it is fast-rewound for the period $t_i$ (e.g. 4 secs), after which time it is stopped.

The location address is sampled ($l_j$) and a value for $S_i$ is calculated from $S_i = l_f - l_j$.

Using the formula 1C the velocity reached after time $t_i$ (4 secs) for tape location $l_f$ is calculated viz:

$$R_{4x} = 2S_{i/ti} = 2(l_f - l_j)/t_i$$

The equation $K_x = R_{4x} - R_i$ is now solved.

The microprocessor now has enough information in memory to enable the tape to travel in both the fast-forward and fast-rewind modes to selected locations. However, as discussed the accuracy of prediction for fast-rewind is to be increased by establishing values for constants $K_y$ and $K_z$.

The location addresses corresponding to $l_{20}$ ($l_g$) and $l_{10}$ ($l_h$) are thus recalled from memory in turn and by the procedure described the tape is caused to travel to each of the positions.

The calibration procedure for $R_x$ is repeated to calibrate values for $R_y$, $R_z$, $K_y$ and $K_z$. The fast-rewind time $T_R$ is suitably defined to cause the tape to remain in the sections $R_{4y}$ and $R_{4z}$ respectively during this final state of the calibration.

On completion of the calibration programme the tape is returned to the start location ready for use.

Although the invention has been described as an attachment for a recording/playback machine clearly this could be built in as an integral part of a new recording/playback machine.

I claim:

1. An attachment for a data recording machine having a movable data recording medium which comprises:
   (a) means for receiving and storing a first signal at a predetermined instant of time, said first signal being indicative of a rest position of the data recording medium, said receiving and storing means being decoupled from said recording medium during a subsequent movement thereof;
   (b) means for entering a second signal indicative of a required position of the data recording medium; and
   (c) comparison and actuation means, said comparison and actuation means being arranged to compare said first and second signals, said comparison and actuation means including means for computing an interval of time commencing at said predetermined instant of time and terminating at a second instant of time when the recording medium would reach said required position upon a moving of said recording medium, thereby predicting any required operation of fast-rewind or fast-forward controls of the data recording machine, an actuator of said comparison and actuation means imparting motion to said recording medium during said time interval and terminating said motion at said second instant of time.

2. An attachment as claimed in claim 1 wherein said comparison and actuation means is arranged to perform such functions a plurality of times to move the data recording medium to its required position according to the accuracy of said first signal.

3. An attachment as claimed in claim 1 wherein said means for entering said second signal comprises a keyboard.

4. An attachment as claimed in claim 1 wherein said comparison and actuation means is arranged such that when the comparison requires the data recording medium to be moved in a forward direction to reach the required position the fast-forward control is arranged to be operated for a time in accordance with the following:

$$T_f = \sqrt{\frac{\left[U_4^2 + 2a_s\left(L - \frac{U_4 t_i}{2}\right)\right] - U_4}{a_s}} + t_1 \text{ secs}$$

where
- $T_f$ = total time for which fast-forward is operated in order to reach a selected medium location.
- $U_4$ = fast-forward velocity reached $t_i$ secs. after starting from rest.
- $a_s$ = secondary acceleration in fast-forward.
- $L$ = distance between the location at which the medium is at rest and the location required.
- $t_i$ = time for the medium to travel initial distance during the period of initial acceleration.

5. An attachment as claimed in claim 1 wherein said comparison and actuation means is arranged such that when the comparison requires the data recording medium to be moved in a reverse or rewind direction to reach the required position the fast-rewind control is arranged to be operated for a time in accordance with the following:

$$T_R = \sqrt{\frac{\left[R_4^2 + 2f_s\left(L - \frac{R_4 t_i}{2}\right)\right] - R_4}{f_s}} + t_i \text{ secs}$$

where
- $T_R$ = total time for which fast-rewind is operated in order to reach a selected tape location.
- $R_4$ = fast-rewind velocity reached $t_i$ secs. after starting from rest.
- $f_s$ = secondary acceleration in fast-rewind.
- $L$ = distance between the location at which the tape is at rest and the location required.
- $t_i$ = time for the medium to travel initial distance during the period of initial acceleration.

* * * * *